United States Patent
Owada et al.

(10) Patent No.: US 7,810,340 B2
(45) Date of Patent: Oct. 12, 2010

(54) QUICK FREEZING APPARATUS AND QUICK FREEZING METHOD

(75) Inventors: Norio Owada, 3-9, Namiki 7-chome, Abiko-shi, Chiba (JP) 270-1165; Shobu Saito, Mito (JP)

(73) Assignee: Norio Owada, Abiko-shi, Chiba (JP)

( * ) Notice: Subject to any disclaimer, the term of this patent is extended or adjusted under 35 U.S.C. 154(b) by 11 days.

(21) Appl. No.: 11/910,154

(22) PCT Filed: Mar. 31, 2005

(86) PCT No.: PCT/JP2005/006402

§ 371 (c)(1),
(2), (4) Date: Jan. 30, 2009

(87) PCT Pub. No.: WO2006/114813

PCT Pub. Date: Nov. 2, 2006

(65) Prior Publication Data

US 2009/0199577 A1  Aug. 13, 2009

(51) Int. Cl.
F25D 17/06 (2006.01)
(52) U.S. Cl. .............................. 62/186; 62/408; 62/410
(58) Field of Classification Search ........... 62/246–256, 62/404–426, 186
See application file for complete search history.

(56) References Cited

U.S. PATENT DOCUMENTS

| 6,250,087 B1 | 6/2001 | Owada |
| 2004/0038642 A1* | 2/2004 | Gatley ........................ 454/239 |

FOREIGN PATENT DOCUMENTS

| JP | 63-14071 | 1/1988 |
| JP | 64-5075 | 1/1989 |
| JP | 06-32377 | 2/1994 |
| JP | 06-032377 | 2/1994 |
| JP | 09-229527 | 9/1997 |
| JP | 9-2298527 | 9/1997 |
| JP | 2001-343176 | 12/2001 |
| WO | WO 01-24647 A1 | 4/2001 |
| WO | WO 01/24647 A1 | 4/2001 |

OTHER PUBLICATIONS

Japanese Patent Office, Office action for application No. 2007-514338, mail date Jan. 20, 2009.

* cited by examiner

*Primary Examiner*—William E Tapolcai
(74) *Attorney, Agent, or Firm*—SoCal IP Law Group LLP; Steven C. Sereboff; John E. Gunther

(57) ABSTRACT

To provide a quick freezing apparatus and method making it possible to prevent a subtle reaction between an object-to-be-preserved and a gas inside its freezing store to prevent deformation and deterioration of the object-to-be-preserved as much as possible and freeze-preserve the object maintaining its freshness and quality at a high standard for a long term, and thereby applicable to a long-term preservation of a living tissue.

A quick freezing apparatus includes a freezing store 11 including a door for bringing in or taking out an object-to-be-frozen 3, a freezer 17 capable of lowering a temperature inside the freezing store to a temperature equal to or less than approximately −30 degrees C., a pressure regulator 60 capable of adjusting a gas pressure inside the freezing store, and a ventilator 31 for sending cold air at a wind velocity of 1 to 5 m/sec toward the object-to-be-frozen placed inside the freezing store. The pressure regulator 60 includes an actuation controller 68 for detecting the temperature inside the freezing store; if the detected inside temperature is equal to or more than a predetermined value, then actuating a depressurizer 62 to decrease the inside gas pressure to a pressure equal to or less than the atmospheric pressure; and when the inside temperature drops below the predetermined value, stopping the depressurizer 62 and actuating the pressurizer 61 to increase the inside gas pressure to a pressure equal to or more than the atmospheric pressure.

23 Claims, 4 Drawing Sheets

FOOD PRODUCT FROZEN TISSUE IMAGING (1)

FOOD PRODUCT : MACKEREL
IMAGING TOOL : SCANNING ELECTRON MICROSCOPE
MAGNIFICATION : 300 X

A     FROZEN WITH QUICK FREEZING APPARATUS OF THE PRESENT INVENTION

B     FROZEN WITH CONVENTIONAL QUICK FREEZING APPARATUS

FOOD PRODUCT FROZEN TISSUE IMAGING (2)

FOOD PRODUCT : LOBSTER
IMAGING TOOL : SCANNING ELECTRON MICROSCOPE
MAGNIFICATION : 100 X

A   FROZEN WITH QUICK FREEZING APPARATUS OF THE PRESENT INVENTION

B   FROZEN WITH CONVENTIONAL QUICK FREEZING APPARATUS

QUICK FREEZING APPARATUS AND QUICK FREEZING METHOD

CROSS-REFERENCE TO RELATED APPLICATION

This application is a National stage application filed under 35 U.S.C. 371 and claims the benefit of priority to Patent Cooperation Treaty Application Number PCT/JP2005/006402 filed Mar. 31, 2005, the contents of which are incorporated herein by reference.

BACKGROUND OF THE INVENTION

1. Technical Field

The present invention relates to a quick freezing apparatus and a quick freezing method making it possible to suppress as much as possible deformation and deterioration of an object-to-be-frozen (for example, a food product, a food ingredient, medical product, a medicine, a living tissue, or a living cell) required to be preserved for a long term.

2. Description of the Related Art

Conventionally, various freezing methods and freezing apparatuses have been developed in order to realize storing of a food product or a food ingredient while keeping its freshness and quality at a high standard. As a technology enabling even a living cell to be frozen-preserved/stored, International Publication No. WO01/024647 discloses a quick freezing method and an apparatus therefor, which have been proposed by the inventor of the present application.

This quick freezing apparatus includes a freezing store capable of lowering a temperature inside the store to a temperature of −30 degrees C. to −100 degrees C., a fluctuating magnetic field generator for applying a unidirectional magnetic field whose strength fluctuates within a predetermined range in both of the positive and negative directions relative to any fixed value set as a reference value, a fan for circulating cold air in the freezing store at a wind velocity of 1 to 5 m/sec, a sound wave generator for superimposing a sound wave within the audio frequency range onto the cold wind circulated by the fan, and an electric field generating device for applying an electric field to the inside of the freezing store.

This freezing apparatus has achieved a significant result in preserving a food ingredient or a food product while keeping its freshness.

Patent Document 1: International Publication No. WO01/024647.

SUMMARY OF THE INVENTION

Problems to be Solved by the Invention

Meanwhile, in recent years, objects to be frozen-preserved are not limited to food products and food ingredients, and the range thereof has greatly extended to include medical products, medicines, living tissues, living cells and so on. Therefore, there has grown a strong demand for the development of a freeze-preserving method and a freezing apparatus capable of preventing deformation and deterioration more effectively.

For example, as regards living tissues, a treatment in which the preservation term of a living tissue is set to a long period of several years to several decades and the living tissue is then used in regeneration therapy is about to become feasible. Specifically, in the dentistry field, tooth regeneration, i.e., extracting a person's tooth such as a wisdom tooth when the person is still young, freeze-preserving it for more than several decades, and then using it for the regeneration therapy, is extremely close to practical use.

However, even the above-mentioned heretofore quick freezing technology is still not effective enough in terms of suppressing deformation and deterioration when the purpose is freeze-preserving a living tissue/cell or the like for such a long term as that described above in order to carry out the transplantation or regeneration therapy, and this technology leaves room for improvement. That is, subsequent research and development has revealed that if the purpose is regeneration therapy, it is necessary to suppress even deformation and deterioration caused by a subtle reaction that proceeds during freezing and preserving processes between an object-to-be-frozen and a gas in a preservation atmosphere surrounding the object, such as water evaporation or oxidization, or caused by a harmful substance or the like emitted from the object itself.

The present invention has been contrived in consideration of the above-mentioned circumstance, and one object thereof is to provide a quick freezing apparatus and a quick freezing method making it possible to suppress even a subtle reaction between an object-to-be-frozen and a gas in a preservation atmosphere surrounding the object to prevent, as much as possible, deformation and deterioration of the object-to-be-frozen and freeze-preserve the object maintaining its freshness and quality at a high standard for a long term, and thereby applicable to long-term preservation of a living tissue.

Means for Solving the Problems

To achieve the foregoing objects, a quick freezing apparatus and a quick freezing method according to the present invention include one or more of the following features:

A quick freezing apparatus according to the present invention includes a freezing store main body with a door for bringing in or taking out an object-to-be-frozen, a freezer capable of lowering a temperature inside the freezing store to a temperature equal to or less than approximately −30 degrees C., a pressure regulator capable of adjusting a gas pressure inside the freezing store, and a ventilator for sending cold air at a wind velocity of 1 to 5 m/sec to the object-to-be-frozen placed in the freezing store.

In some embodiments, the pressure regulator may be a pressurizer for increasing the inside gas pressure to a pressure equal to or more than atmospheric pressure by supplying a pressurized gas into the freezing store.

In other embodiments, the pressure regulator may be a depressurizer for decreasing the inside gas pressure to a pressure equal to or less than atmospheric pressure by drawing the inside gas.

In still other embodiments, the pressure regulator may include both of a pressurizer for increasing the inside gas pressure to a pressure equal to or more than atmospheric pressure by supplying a pressurized gas into the freezing store, and a depressurizer for decreasing the inside gas pressure to a pressure equal to or less than the atmospheric pressure by drawing the inside gas.

Preferably, the pressure regulator may include an actuation controller for detecting the temperature inside the freezing store; if the inside temperature is equal to or more than a predetermined temperature, then actuating the depressurizer to decrease the inside gas pressure to a pressure equal to or less than the atmospheric pressure; and when the inside temperature drops below a predetermined value, stopping the depressurizer and actuating the pressurizer to increase the inside gas pressure to a pressure equal to or more than the atmospheric pressure.

In some embodiments, the pressurizer may include a pressurizing pump, and a gas introduction path of the pressurizing pump may be connected to a circulating path through which the gas inside the freezing store is circulated.

In some embodiments, the depressurizer may include a suction pump, and a discharge side of the suction pump may be connected to a circulating path through which a sucked gas is circulated to the inside of the freezing store.

In other embodiments, the pressurizer may include a pressurizing pump and the depressurizer may include a suction pump, and a discharge side of the suction pump may be connected to a circulating path through which a sucked gas is circulated to a gas introduction path of the pressurizing pump.

Further, a sterilizer may be provided on the gas circulating path of the pressurizer.

Similarly, a sterilizer may be provided on the gas circulating path of the depressurizer.

Further, an oxygen absorber may be provided on the gas circulating path of the pressurizer.

Similarly, an oxygen absorber may be provided on the gas circulating path of the depressurizer.

Further, a gas supply source for selecting and supplying any gas suitable for the object-to-be-frozen such as a nitrogen gas may be provided to the gas circulating path of the pressurizer.

The quick freezing apparatus may further include a gas introducer for, when the door of the freezing store is being opened, supplying into the freezing store any gas suitable for the object-to-be-frozen such as a nitrogen gas to increase the inside gas pressure back to an atmospheric pressure level.

The quick freezing apparatus may further include a gas curtain unit provided near a door opening of the freezing store for producing a layered gas flow from the upper side toward the lower side, wherein the layered gas flow prevents the outside gas from mixing with the inside gas when the door is opened.

Further, an oxygen absorber may be disposed in the freezing store.

Further, a sterilizer may be disposed in the freezing store.

Preferably, the freezing store may include a static magnetic field generator for applying a static magnetic field with a strength of any fixed value to the object-to-be-frozen inside the freezing store, a fluctuating magnetic field generator for applying to the object-to-be-frozen inside the freezing store a fluctuating magnetic field fluctuating within a predetermined range in the positive and negative directions relative to any fixed value set as a reference value, an electric field generator for applying an electric field to the object-to-be-frozen inside the freezing store, and a sound wave generator for superimposing a sound wave within the audio frequency range onto the cold air.

A quick freezing method according to the present invention includes maintaining a temperature of approximately –30 degrees C. or less as a temperature inside a freezing store which includes a door for bringing in and taking out an object-to-be-frozen, increasing a gas pressure inside the freezing store to a pressure more than atmospheric pressure, and freezing the object-to-be-frozen while sending cold air at a wind velocity of 1 to 5 m/sec to the object-to-be-frozen placed in the freezing store.

Another quick freezing method according to the present invention includes maintaining a temperature of approximately –30 degrees C. or less as a temperature inside a freezing store which includes a door for bringing in and taking out an object-to-be-frozen, decreasing a gas pressure inside the freezing store to a pressure less than atmospheric pressure, and freezing the object-to-be-frozen while sending cold air at a wind velocity of 1 to 5 m/sec to the object-to-be-frozen placed in the freezing store.

It is preferable to maintain a temperature of approximately –30 degrees C. or less as a temperature inside a freezing store which includes a door for bringing in and taking out an object-to-be-frozen; decrease a gas pressure inside the freezing store to a pressure less than atmospheric pressure until a gas temperature inside the freezing store drops to a predetermined temperature; once the inside temperature drops to the predetermined temperature, increase the inside gas pressure to a pressure equal to or more than the atmospheric pressure; and freeze the object-to-be-frozen while sending cold air at a wind velocity of 1 to 5 m/sec to the object-to-be-frozen placed in the freezing store.

In increasing the inside gas pressure, it is preferable to compress any gas suitable for the object-to-be-frozen such as a nitrogen gas and supply it into the freezing store.

It is preferable, in decreasing the inside gas pressure, to suck the gas inside the freezing store with a suction pump to decrease the pressure; and in opening the door, to supply any gas suitable for the object-to-be-frozen such as a nitrogen gas into the freezing store to increase the inside gas pressure back to an atmospheric pressure level prior to opening the door.

In opening the door, it is preferable to produce a layered gas flow from the upper side toward the lower side with a gas curtain unit provided near an opening for the door, wherein the layered gas flow prevents the outside gas from mixing with the inside gas.

Effect of the Invention

According to a quick freezing apparatus and a freezing method of the present invention configured as described above, it is possible to freeze-preserve an object-to-be-frozen for a long term with its deterioration suppressed as much as possible.

More specifically, by adjusting a gas pressure inside a freezing store to decrease the inside pressure to a pressure equal to or less than atmospheric pressure using a pressure regulator, it becomes possible to reduce an amount of harmful gas in the freezing store atmosphere, such as oxygen, and to discharge and eliminate harmful gas emitted from the object-to-be-frozen itself, so that it becomes possible to freeze the object-to-be-frozen while suppressing oxidization of the object and deterioration thereof caused by the harmful gas as much as possible.

Further, by decreasing the gas pressure, a temperature drop can be facilitated, so that it becomes possible to accelerate cooling to a predetermined temperature and therefore improve the operation efficiency as much as possible.

On the other hand, by increasing the inside gas pressure to a pressure equal to or more than atmospheric pressure, it becomes possible to suppress evaporation of water in the cells of an object-to-be-froze and prevent drying of the object. Therefore, the deterioration can be prevented as much as possible.

In the above pressurization, for example, a gas with a low oxygen level or without oxygen at all, such as a pressurized nitrogen gas, is supplied to increase the inside gas pressure. This contributes to reducing the concentration of harmful gases in the freezing store atmosphere or the oxygen level, so that it becomes possible to freeze the object while suppressing as much as possible deterioration caused by the harmful gas or the oxygen. Here, a pressurizing pump may be used as a pressurizer, or a harmless gas may be directly supplied from a high pressure tank, for example, by using a high pressure nitrogen tank.

By providing a circulating path for the gas inside the freezing store, it becomes possible to recycle an already cooled air inside the freezing store, thereby promoting the efficiency of freezing operation and presenting an energy saving freezing system. In addition, by providing an oxygen absorber and a sterilizer on the circulating path, purification of a return gas can be facilitated, and it becomes possible to further enhance the effect of maintaining a high quality for a long preservation term.

Meanwhile, care should be taken at the time of bringing in or taking out an object-to-be-frozen so that harmful gases, germs, dusts and the like contained in the outside air do not flow into the freezing store while opening the door. By keeping the inside of the freezing store in a pressurized state, this can be achieved without any special caution.

Further, such an undesired inflow can be more securely prevented by disposing inside the freezing store near its door a gas curtain unit which uses a gas having a condition similar to the inside atmosphere. The gas curtain unit may be used in freezing an object while executing only depressurization.

Furthermore, it may be useful to combine depressurization and pressurization, that is, upon starting the freezing operation, to carry out freezing while decreasing the inside gas pressure to a pressure less than atmospheric pressure until a temperature inside the freezing store drops to a predetermined temperature (for example, −30 degrees C.), and after that, increase the inside gas pressure to a pressure more than the atmospheric pressure. Effects brought about by depressurization and pressurization are combined to produce a synergy effect, which contributes to a more effective suppression of deterioration of an object to be preserved. In addition, it is possible to efficiently and easily replace oxygen inside the freezing store with a harmless gas such as nitrogen.

According to the present invention, a unidirectional magnetic field is applied to an object-to-be-frozen during quick-freezing the object in the freezing store. Thus, this magnetic field makes it possible to direct magnetic moments, which are generated by the electron spins and nuclear spins of the molecules constituting the object-to-be-frozen and of the free water molecules contained therein, in one direction. Thus cold can be transmitted to the inner portion of the object-to-be-frozen quickly. That is, the difference between inside and surface temperatures in the object-to-be-frozen which occurs during cooling, i.e., the nonuniformity in cooling can be considerably diminished to realize quick cooling.

Since cooling is carried out while a magnetic field is applied to an object-to-be-frozen, the free water within the object-to-be-frozen can be brought into a supercooled state. (Meanwhile, at this time, the application of the magnetic field causes the clusters of the free water to become small, and thereby facilitates hydration of the clusters with the substrates of the food product to form hydration structures. As a result, the amount of the free water in the object-to-be-frozen is reduced, and thereby supercooling is further facilitated.) A further cooling will initiate freezing of the free water in a supercooled state to take place, but since a heat quantity equivalent to the latent heat for solidification (forming ice) has already been removed, the freezing proceeds quickly. As a result, the time from the freezing start to the end can be considerably shortened.

Due to the combination of the above two effects, the freezing process quickly passes through the temperature range of 0 to −20 degrees C. in which crystals are apt to grow during freezing. Therefore, the ice crystals of the free water are prevented from growing to be too large and rough, and instead become small and fine. With such small and fine ice crystals, it is possible to prevent as much as possible destruction of the cellular structures of an object-to-be-frozen during the freezing process, and thereby suppress dripping upon defrosting and preserve the freshness at a high standard.

Furthermore, since the magnetic field fluctuates, the magnetic flux is changed and electromagnetic induction occurs within an object-to-be-frozen. Then, free electrons are generated therein by the induced electromotive force caused by the electromagnetic induction. The object-to-be-frozen is reduced by these free electrons and is prevented from oxidization.

According to the present invention, an object-to-be-frozen is cooled with cold air having a wind velocity of 1 to 5 m/sec and a sound wave within the audio frequency range is superimposed onto the cold air. Since a sound wave is superimposed onto the cold air which contacts the object-to-be-frozen, the slight change in air pressure caused by the sound wave can effectively stir up an air boundary layer which is formed over the surface of the object-to-be-frozen or the surface of a pan onto which the object-to-be-frozen is placed, and which inhibits heat transmission. Therefore, heat transmission is improved and the cooling of the object-to-be-frozen caused by the cold air is accelerated, thereby enabling the temperature to drop quickly. As a result, the freezing process can quickly pass through the temperature range of 0 to −20 degrees C., in which ice crystals of free water become bulky. Therefore, the ice crystals can be prevented from growing to be too large.

Since the wind velocity of the cold air is set within the range of 1 to 5 m/sec, it is possible to realize a convection heat transfer effective enough to accelerate the cooling rate, while preventing oxidization on the surface of an object-to-be-frozen by keeping a bound water film on the surface of the object-to-be-frozen from evaporating. That is, when the wind velocity is too slow, the heat transfer between the cold air and the object-to-be-frozen will be little, therefore making it difficult to achieve freezing using the quick temperature drop; however, since the wind velocity is 1 m/sec or greater, this problem can be avoided as much as possible. On the other hand, when the wind velocity is over 5 m/sec, the bound water film will evaporate and the surface of the object-to-be-frozen will be exposed, causing oxidization of the surface; however, since the wind velocity is 5 m/sec or less, this problem can also be avoided.

When the electric field is applied to an object-to-be-frozen, water molecules and oxygen molecules within the freezing store are given electrons, and thereby turn into electron-added water ($H_2Oe$) or superoxide anion ($O_2-$). This electron-added water and superoxide anion produce hydroxyl radicals or the like, by which the cell membranes of microbes such as bacteria can be destroyed. Thus, by applying an electric field during freezing, it is possible to significantly reduce the number of living microbes, suppressing putrefaction of an object-to-be-frozen.

In sum, according to the present invention, freezing is carried out while adjusting the pressure, such as increasing the inside pressure to a pressure more than atmospheric pressure, decreasing the inside pressure to a pressure less than the atmospheric pressure, or decreasing it and then increasing it, as well as applying a fluctuating magnetic field and an electric field to the inside of the freezing store and also sending cold air onto which a sound wave is superimposed to an object-to-be-frozen. These arrangements make it possible to suppress as much as possible deterioration and deformation caused by a subtle reaction which occurs during a freeze-preservation process between an object-to-be-preserved and a gas in the preservation atmosphere surrounding the object, such as water evaporation and oxidization, or by harmful substances or the like emitted from the object itself, and therefore make it possible to realize freeze-preservation applicable to even a long-term preservation of a living tissue.

DESCRIPTION OF THE REFERENCE NUMERALS

1 Quick Freezing Apparatus
3 Object-To-Be-Frozen
11 Freezing Store
13 Main Body
13c Door
17 Freezer
21 Fluctuating Magnetic Field Generator
21a Static Magnetic Field Generator
21b Dynamic Magnetic Field Generator
31 Fan (Ventilator)
41 Sound Wave Generator
51 Electric Field Generator
60 Pressure Regulator
61 Pressurizer
61a Pressurizing Pump
61b Gas Introduction Path
62 Depressurizer
62a Suction Pump
63 Circulating Path
65 Gas Purifier (Sterilizer, Oxygen Absorber)
66 Gas Supply Source
67 Gas Introducer
68 Actuation Controller
70 Gas Curtain Unit

DETAILED DESCRIPTION OF THE INVENTION

Best Mode for Carrying Out the Invention

Figure 1:
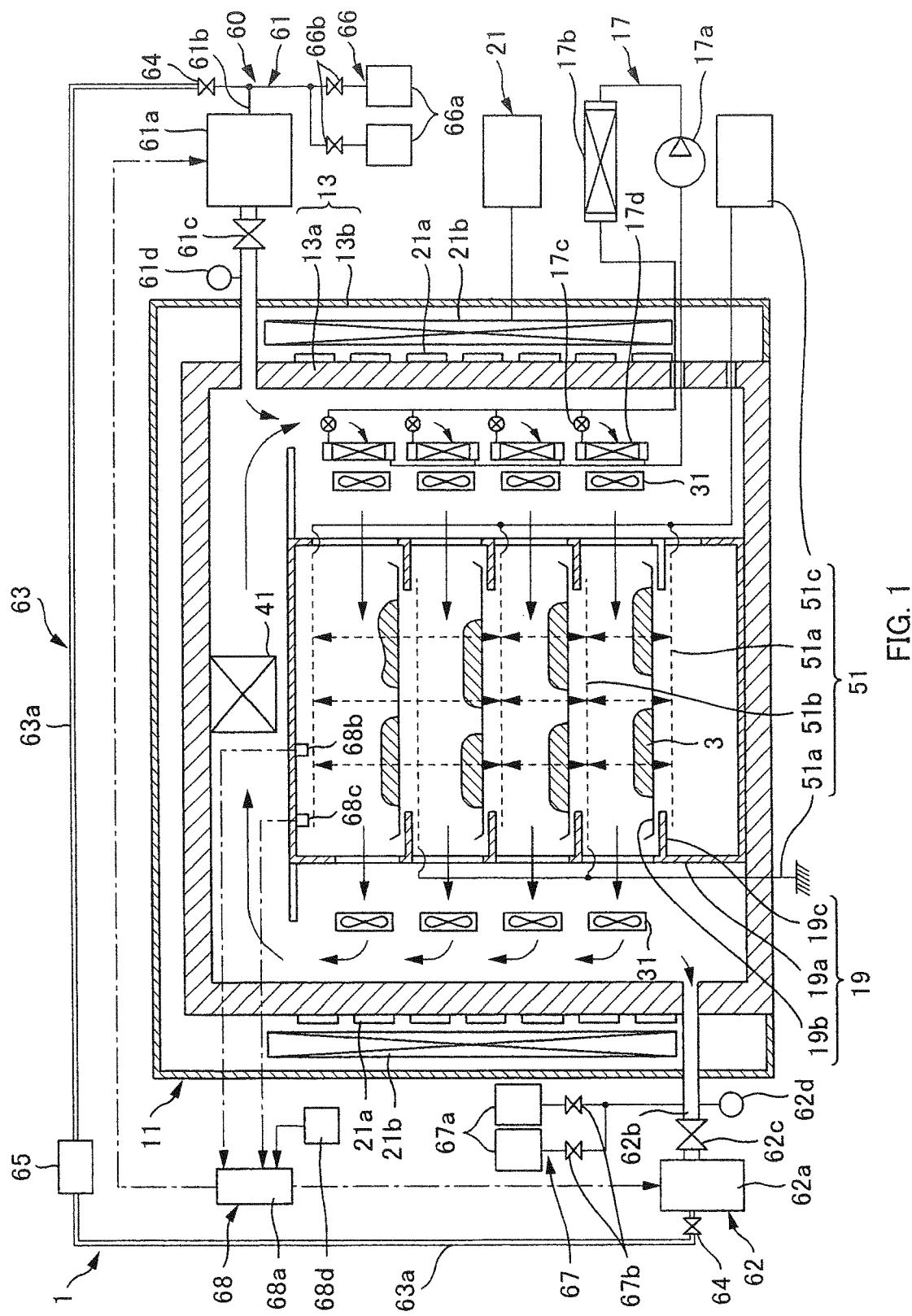
FIG. 1 is a schematic diagram illustrating a central section of an inside of a freezing store of a quick freezing apparatus according to the present invention.
Figure 2:
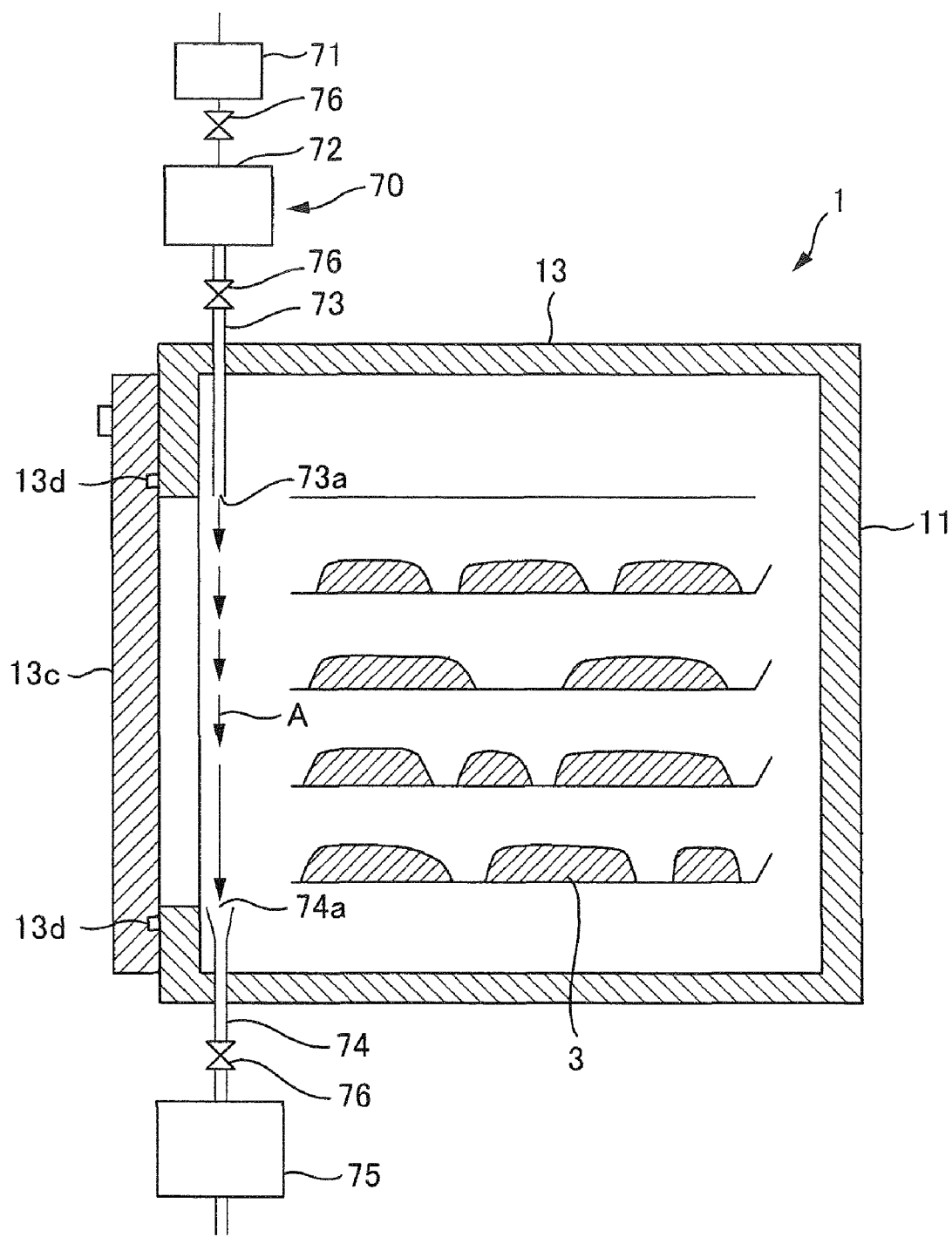
FIG. 2 is a schematic diagram illustrating a transverse cross-section including the freezing store and an open/close door of the quick freezing apparatus according to the present invention.

A preferred embodiment of the present invention will be described in detail below with reference to the accompanying drawings. FIGS. 1 and 2 are schematic diagrams showing an exemplary embodiment of a super-quick freezing apparatus according to the present invention. FIG. 1 is a central section of the inside of a freezing store thereof, while FIG. 2 is a sectional side elevation thereof.

As shown in FIGS. 1 and 2, a super-quick freezing apparatus 1 of the present embodiment includes a freezing store 11 capable of realizing an inside temperature of −30 degrees C. to −100 degrees C., a fluctuating magnetic field generator 21 for applying a fluctuating magnetic field to the central portion of the inside of the freezing store 11, the fluctuating magnetic field fluctuating 5 Gs in the positive and negative directions relative to any fixed value set as a reference value such as 100 Gs, fans 31 serving as ventilators for circulating cold air in the freezing store 11 at a wind velocity of 1 to 5 m/sec, a sound wave generating device 41 serving as a sound wave generator for superimposing a sound wave onto the cold air circulated by the fans 31, the sound wave having a sound pressure level of 2 Pa and a sound intensity level of $10^{-2}$ W/m2 and being within the audio frequency range, and an electric field generating device 51 serving as an electric field generator for applying an electric field ranging between 100 to 1000 kV/m to the central portion of the inside of the freezing store 11.

The freezing store 11 includes a main body 13 having an open/close door 13c at the front thereof, capable of being sealingly closed and being substantially rectangular solid in shape, and a freezer 17 for cooling the main body 13.

The freezer 17 adopts a typical refrigeration cycle in which a compressor 17a, a condenser 17b, expansion valves (or capillary tubes) 17c, and evaporators 17d are sequentially circularly connected together, and a refrigerant is circulated therethrough. The evaporators 17d, which generate cold air, and the expansion valves 17c are arranged inside the main body 13, while the compressor 17a and the condenser 17b are placed outside the freezing store.

The main body 13 has a double-wall structure comprising a freezing chamber defining wall 13a, which defines the space inside the freezing store, and an outer wall 13b, which surrounds the wall 13a at some distance therefrom to define an outer portion. A heat insulating material (not shown) is arranged between the outer wall 13b and the freezing chamber defining wall 13a, and a far-infrared-ray absorbing material (not shown) is coated over the whole inner surface of the freezing chamber defining wall in order to enhance the cooling efficiency inside the freezing store.

Located in the substantially center portion of the inside of the freezing store is a rack 19 onto which an object-to-be-frozen 3 such as a food ingredient or a food product is placed. The rack 19 includes a grating-like framing 19a wherein substantially U-shaped portal frames placed anteroposteriorly opposite each other are connected together by rod-like members such as angle irons, and pans 19b which are supported by engaging members 19c fixed onto the framing 19a at appropriate intervals in the vertical direction. The pan 19b, in turn, supports the object-to-be-frozen 3 thereon. The pans 19b are detachably-attachably engaged onto the engaging members 19c to form several detachable/attachable shelves in the framing 19a. The before-mentioned evaporators 17d are disposed on the right side of the rack 19 in FIG. 1.

The evaporator 17d is formed by folding a copper pipe several times. The inside of the freezing store is cooled by latent heat during evaporation of the refrigerant flowing through the evaporator, that is, cold air is generated by the evaporator 17d. The evaporator 17d is circularly connected to the before-mentioned outer compressor 17a and condenser 17b, and the expansion valve 17c by piping or another method, and constructs a refrigeration cycle capable of realizing an inside temperature of −30 degrees C. to −100 degrees C.

The fans 31, serving as ventilators for circulating cold air inside the freezing store, are arranged on the both sides of the rack 19. The fans 31 on one side are located in front of the evaporators 17d and send the cold air cooled by the evaporators 17d horizontally towards objects-to-be-frozen 3 supported on the rack 19. In order to supply a cold wind of a uniform velocity to each object-to-be-frozen 3, the plurality of fans 31 are arranged at appropriate intervals in the vertical and depth directions. The wind velocity at an object-to-be-frozen 3 is adjustable within the range of 1 to 5 m/sec, and is determined depending mainly on the type of object-to-be-frozen.

Due to cold air having a wind velocity within the range of 1 to 5 m/sec, it is possible to realize a convection heat transfer effective enough to accelerate the cooling rate, while preventing oxidization on the surface of an object-to-be-frozen by keeping a bound water film on the surface of the object-to-be-frozen from evaporating. That is, when the wind velocity is too slow, the convention heat transfer will not be effective and the heat transfer between the cold air and the object-to-be-frozen will be little, therefore making it difficult to achieve quick freezing; however, since the wind velocity is 1 m/sec or greater, this problem can be avoided as much as possible. On the other hand, when the wind velocity is over 5 rn/sec, the bound water film will evaporate and the surface of the object-to-be-frozen will be exposed, causing oxidization of the surface; however, since the wind velocity is 5 m/sec or less, this problem can also be avoided.

The cold air itself is heated while cooling an object-to-be-frozen 3. Thus, a circulation path is formed such that after contacting with an object-to-be-frozen 3, the air ascends along the surface of the freezing chamber defining wall on the opposite side, and moves along the bottom surface of the ceiling and the surface of the freezing chamber defining wall behind the freezer 17, and then returns to the evaporators 17d.

The sound wave generating device 41 is disposed just beneath the bottom surface of the ceiling, which is a part of the above-mentioned circulation path. This sound wave generating device 41 generates a sound wave by producing air vibration using the vibration of an electromagnetic coil (not shown) connected to a commercial AC power source of 50 or 60 Hz. The thus-generated sound wave is a low-frequency sound within the audio frequency range that comprises a frequency equal to the frequency of the commercial AC power source, that is, 50 or 60 Hz, and a harmonic overtone with a frequency of its integer multiple. This sound wave is superimposed onto the circulated cold air and brought into contact with an object-to-be-frozen 3. The sound wave causes a slight change in air pressure and thereby stirs up an air boundary layer which is formed on the surface of an object-to-be-frozen 3 and on the surface of the pan 19b onto which the object-to-be-frozen 3 is placed. The air boundary layer inhibits heat transfer, so that stirring it up facilitates heat transfer.

Due to use of a sound wave in the audio frequency range, it is possible to prevent oxidization on the surface of an object-to-be-frozen 3 as much as possible without causing destruction of a bound water film formed on the surface of the object-to-be-frozen 3. In other words, it is possible to prevent a bound water film on the surface of an object-to-be-frozen 3 from being stripped off, which would occur when the frequency is too high, such as in the ultrasonic range.

It is preferable to use a sound wave having a sound pressure level of $2 \times 10^{-4}$ Pa to 60 Pa and a sound intensity level of $10^{-10}$ W/m2 to 10 W/m2. Using a sound wave in these ranges will prevent a bound water film from being stripped off and a noise from being emitted while enabling an air boundary layer to be effectively stirred up.

The before-mentioned electric field generating device 51 includes electrode plates disposed immediately above the respective pans 19b of the rack 19, an electrode plate disposed immediately beneath the undermost pan 19b, a high-voltage alternating current potential generator 51c which is connected to every other plate of the electrode plates to apply an alternating high-voltage potential or a high-voltage alternating current potential, and a ground portion 51d connected to the remaining electrode plates that are not connected to the high-voltage alternating current potential generator 51c. The electrode plates are broadly grouped into first electrode plates 51a to which a high-voltage alternating current potential is applied by the high-voltage alternating current potential generator 51c, and second electrode plates 51b which are connected to the ground through the ground portion 51d, the first and second electrode plates 51a, 51b being disposed alternately in the vertical direction. When a high-voltage alternating current potential is given to the first electrode plate, an electric field whose direction is inverted periodically is generated in the space between the first electrode plate and the second electrode plates facing this first electrode plate on the upper and lower sides thereof, and the electric field is applied in the vertical direction to the object-to-be-frozen 3 on the pan 19b that is located in the space. Here it should be noted that, since the first and second electrode plates are disposed alternately, the electric field to be applied to the object-to-be-frozen 3 is applied to the vertically adjacent shelves in inverse directions, as indicated by broken lines in FIG. 21. (Since a high-voltage alternating current potential is given to the first electrode plate, the direction of the electric field indicated by the broken line is inverted periodically.) The first electrode plates 51a are fixed to the framing 19a with electric insulators (not shown) therebetween, so that they are completely electrically insulated, except their connections to the high-voltage alternating current potential generator 51c. Similarly, the second electrode plates 51b are fixed to the framing 19a with electric insulators (not shown) therebetween, so that they are completely electrically insulated, except their connections to the ground portion 51d.

The strength of the electric field depends on the high-voltage alternating current potential applied to the first electrode plate 51a, and the distance between the electrode plate 51a and the pan 19b, and the strength is adjusted within the range of 100 to 1000 kV/m by changing the high-voltage alternating current potential according to the type of object-to-be-frozen 3. In addition, the high-voltage alternating current potential is adjusted so as to sinusoidally change in view of time.

When an electric field is applied to the inside the freezing store, water molecules and oxygen molecules within the freezing store are given electrons, and thereby turn into electron-added water ($H_2Oe$) or superoxide anion ($O_2-$). This electron-added water and superoxide anion produce hydroxyl radicals or the like, by which the cell membranes of microbes such as bacteria can be destroyed. Thus, by applying an electric field during freezing, it is possible to realize an antibacterial effect, preventing putrefaction of an object-to-be-frozen 3 and keeping the high quality thereof. It should be noted that, although the cells on the surface of an object-to-be-frozen 3 are destroyed by the hydroxy radicals as well, this amount is just negligible, considering the overall cells of the object-to-be-frozen.

As mentioned earlier, preferably, the strength of electric field is adjusted within the range of 100 to 1000 kV/m. That is because, if it is smaller than 100 kV/m, the number of hydroxy radicals produced will be too small to be effective for antibacterial action, while if it is over 1000 kV/m, the risk of electric discharge will become higher. However, in practical use, a strength within the range of 2 kV/m to 60 kV/m may be appropriate.

The fluctuating magnetic field generator 21 includes a static magnetic field generator 21a for applying a static magnetic field to the central portion of the inside of the freezing store 11, and a dynamic magnetic field generator 21b for applying to the central portion of the inside of the freezing store a fluctuating magnetic field which has an amplitude amounting to 5% of the strength of the static magnetic field and fluctuates in the positive and negative directions relative to the static magnetic field. The static magnetic field generator 21a is a permanent magnet 21a which is made from a ferrite plate having a strength of 1500 Gs and formed into a rectangular strip of 1.0 m×0.1 m×0.05 m. One of the long sides thereof has a polarity of the N-pole, and the other long side has a polarity of the S-pole. Multiple permanent magnets 21a are disposed in appropriately spaced apart relations on the outer surface of a side wall among the freezing chamber defining walls 13a with their N-pole long sides up. The magnets are also disposed on the outer surfaces of the other three side walls so as to have the same polarity directions, and thereby a vertical static magnetic field is applied to objects-to-be-frozen 3 on the rack 19 located in the central portion of the inside of the freezing store. In the present embodiment, the strength of the static magnetic field at the central portion of the inside of the freezing store is adjusted to 100 Gs with the permanent magnets 21a having strengths of 1500 Gs. However, the strength of the static magnetic field at the central portion can be changed by appropriately selecting the permanent magnet. The above-mentioned effect brought about by a magnetic field can be obtained if the strength is greater than the terrestrial magnetism (0.3 Gs to 0.5 Gs,). Thus, the magnetic field may have any strength of 1 Gs or over. Then, considering the limits in manufacturing a permanent magnet, it is appropriate to set the strength in the range of 1 to 20000 Gs.

The dynamic magnetic field generator is an electromagnetic coil 21b that generates a magnetic field when an electric current is supplied thereto. The two electromagnetic coils 21b are disposed outside of and lateral to the freezing chamber defining walls 13a on the opposite sides of the freezing store. The electromagnetic coils 21b are disposed so that the axes thereof extend in the vertical direction, and when an alternating current having a certain specific frequency runs through the electromagnetic coils 21b, a magnetic field, which has the same frequency and fluctuates back and forth periodically and sinusoidally, is applied to the central portion of the inside of the freezing store in parallel to the above-mentioned static magnetic field. The static magnetic field and the non-static magnetic field, i.e. the dynamic magnetic field, are superimposed onto each other, and thereby a fluctuating magnetic field is applied to the central portion of the inside of the freezing store.

For example, in the present embodiment, an alternating current is supplied to the electromagnetic coils 21b through a commercial AC power source 22 of 50 Hz or 60 Hz. Then, a dynamic magnetic field with a strength of ±5 Gs, which is equal to 5% of the strength of the static magnetic field, is generated. This dynamic magnetic field is superimposed onto the static magnetic field having a strength of 100 Gs, and a fluctuating magnetic field that fluctuates sinusoidally in the range of 95 to 105 Gs with a frequency of 50 Hz or 60 Hz is applied to the central portion of the inside of the freezing store.

In the present embodiment, the fluctuation range of the magnetic field is the range of the amplitude equal to 5% of the strength of the static field, i.e., the range of −5% to +5% relative to the strength of the static field. However, the larger amplitude is the better. However, considering electricity consumption of the electromagnetic coil, the range of 1 Gs to 100 Gs for the amplitude is appropriate in practical use.

Now, the effect of the magnetic field is described.

When the magnetic field is applied to an object-to-be-frozen 3 during cooling, the magnetic moments, which are generated by the electron spins and nuclear spins of the molecules constituting the object-to-be-frozen 3 and of the free water molecules contained therein, are aligned in one direction by the magnetic field. This makes it possible to rather quickly transmit cold to the inner portion of the object-to-be-frozen 3. That is, the difference between inside and surface temperatures of the object-to-be-frozen 3 while the object 3 is being cooled, i.e., the nonuniformity in cooling, is significantly reduced, and even the inner portion is cooled quickly, and therefore the time elapsed from the freezing start to the freezing end can be reduced as much as possible.

Moreover, when cooling is carried out while a magnetic field is applied to an object-to-be-frozen 3, the free water within the object-to-be-frozen 3 is brought into a supercooled state. (Meanwhile, at this time, as will be described later, the application of the magnetic field causes the clusters of the free water to become small, and thereby facilitates hydration of the clusters with the substrates of the food product to form hydration structures. As a result, the amount of the free water in the object-to-be-frozen is reduced, and thereby supercooling is facilitated.) A further cooling will initiate freezing to take place, but since a heat quantity equivalent to the latent heat for solidification (forming ice) has already been removed, the freezing proceeds quickly, and accordingly the temperature of the object-to-be-frozen 3 drops quickly.

As a result, the above two effects together contribute to significantly reducing the time elapsed from the start of freezing of the free water to the end thereof, that is, the freezing process quickly passes through the temperature range of 0 to −20 degrees C. in which ice crystals easily grow. Therefore, the ice crystals of the free water are prevented from growing to be too large and rough, and instead become small and fine. With such small and fine ice crystals, it is possible to prevent as much as possible destruction of the cellular structures of an object-to-be-frozen 3 during the freezing process, and thereby prevent dripping upon defrosting and preserve the freshness at a high standard.

In general, water clusters are turned into bound water by hydrogen bonding with polar groups which surface on the outsides of the tertiary structures of the proteins constituting an object-to-be-frozen 3. Applying a magnetic field causes a water cluster, which is an aggregation of free water molecules, to be broken down into small groups, and then the small clusters closely and evenly attach to the outer surfaces of the tertiary structures to form an envelope-like covering. That is, the small clusters evenly attach over the whole outer surfaces in a monomolecular layer-like manner to form a bound water film. The thus-formed bound water film prevents the tertiary structures, i.e., the object-to-be-frozen 3 from being oxidized, and the freshness thereof can be preserved at a high standard.

Generally, the above-mentioned bound water does not freeze, because the bound water is strongly drawn to the tertiary structures and therefore its freezing point drops to the range of −10 to −100 degrees C. By forming small clusters, free water is bound to the outer surfaces of the tertiary structures thoroughly, and thus, most of the free water is turned into bound water. Therefore, the absolute amount of the free water is reduced, and it becomes possible to indirectly prevent free water crystals from growing to be too large and rough.

Further, by fluctuating the magnetic field, it is possible to reduce the counteraction against the action of the static magnetic field, i.e., demagnetizing field action, and enable the function imparted by the application of the main magnetic field to work efficiently, and considerably enhance the above-explained effect of the magnetic field.

Furthermore, by fluctuating the magnetic field, the magnetic flux is changed and electromagnetic induction occurs within an object-to-be-frozen. Then, free electrons are generated therein by the induced electromotive force caused by the electromagnetic induction. Therefore, the object-to-be-frozen is reduced by these free electrons and is prevented from oxidization.

The freezing apparatus 1 of the present embodiment that has been described until now has the same feature and configuration as those of the apparatus disclosed by the applicant of the present application in International Publication No. WO01/024647, which is herein presented as conventional art. However, the freezing apparatus 1 according to the present invention includes additional features, as will be described below.

The freezing store 11 further includes a pressure regulator 60 capable of adjusting a gas pressure within the freezing store. The pressure regulator 60 includes a function of increasing a gas pressure within the freezing store 11, or conversely, a function of decreasing it. Preferably, the pressure regulator 60 may include both functions of increasing and decreasing a gas pressure. In the present embodiment, the pressure regulator 60 includes a pressurizer 61 for increasing a gas pressure inside the freezing store 11 by supplying a pressurized gas into the freezing store 11 so that the gas pressure exceeds the atmospheric pressure, and a depressurizer 62 for decreasing a gas pressure inside the freezing store 11 by drawing the gas inside the store 11 so that the gas pressure becomes below the atmospheric pressure.

Specifically, in the present embodiment, a pressurizing pump 61a is used as the pressurizer 61. The discharge side of the pressurizing pump 61a is communicated with the inside of the freezing store 11 through a pressure regulating valve 61c, and a pressure meter 61d is provided on a discharge side communication path in order to monitor the pressurization level.

Similarly, in the present embodiment, a suction pump 62a is used as the depressurizer 62. The inlet side of the suction pump 62a is communicated with the inside of the freezing store 11 through a pressure regulating valve 62c, and a pressure meter 62d is provided on an inlet side communication path 62b in order to monitor a depressurization level.

There is provided a pipe 63a connecting the discharge side of the suction pump 62a with a gas introduction path 61b of the pressurizing pump 61a, forming a gas circulating path 63 through which a gas inside the freezing store 11 circulates. A gas purifier 65 is provided on the gas circulating path 63, and open/close valves 64, 64 are provided near the discharge side of the suction pump 62a and the gas introduction path 61b of the pressurizing pump 31a, respectively. The gas purifier 65 eliminates germs contained in a circulating inside gas and reduces the amount of oxygen therein, and an oxygen absorber and a sterilizer are provided in the gas purifier 65 so as to exist on a gas circulating route. As the sterilizer, silver may be adopted. Silver as the sterilizer may be provided by, for example, coating it on the inner surface of the gas circulating route. Also, an additional sterilizer and oxygen absorber may be provided inside the freezing store 11. The oxygen absorber (not shown) may be attached to the inner wall of the freezing store 11 in order to serve to reduce the oxygen level inside the store 11. In addition, the sterilizer (for example, silver foil or leaf) may be attached to the inner wall of the freezing store 11 as well.

In the present embodiment illustrated herein, the gas circulating path 63 is shared by the pressurizer 61 and depressurizer 62, but gas circulating paths independently provided for the pressurizer 61 and the depressurizer 62 may be arranged in parallel.

Further, on the gas introduction path 61b of the pressurizing pump 61a, a gas supply source 66 is arranged in parallel to the gas circulating path 63. The gas supply source 66 supplies into the freezing store a gas selected according to the type of object-to-be-frozen, such as a nitrogen gas. The gas supply source 66 includes a plurality of tanks 66a, in each of which a different gas is sealingly contained in a compressed state, and open/close valves 66b for the tanks 66a. According to the type of object-to-be-frozen 3, the open/close valves 66b of the tanks 66a are selectively opened or closed to supply a gas suitable for the object 3 into the freezing store through the pressurizing pump 61a. In other embodiments, one of the tanks may be replaced with an oxygen filter made by filling an oxygen absorber into a container, so that outside air can be taken in therethrough, and air containing little oxygen may be supplied as a safe gas source.

On the other hand, on the inlet side of the suction pump 62a, there is provided a gas introducer 67. The gas introduction source 67, when a gas pressure inside the store 11 is lower than the atmospheric pressure and the door 13c of the freezing store 11 needs to be opened, supplies into the store 11 a gas selected according to the type of object-to-be-frozen 3 such as a nitrogen gas, and increases the inside gas pressure to the same level as the atmospheric pressure prior to opening the door. The gas introduction source 67 includes a plurality of tanks 67a, in each of which a different gas is sealingly contained in a compressed state, and open/close valves 67b for the tanks 67a, similar to the above-described gas supply source 66 provided on the side of the pressurizing pump 61a. According to the type of object-to-be-frozen 3, the open/close valves 67b of the tanks 67a are selectively opened or closed in order to supply a gas suitable for an object 3 into the freezing store 11. The gas introduction source 67 is connected to the upstream side of the pressure regulating valve 62c serving also as an open/close valve provided on the inlet side communication path 62b. Also in this source, one of the tanks may be replaced with an oxygen filter made by filling an oxygen absorber into a container, so that outside air can be taken in therethrough, and air containing little oxygen may be supplied as a safe gas source.

In the present embodiment, an electromagnetic valve is used as the open/close valve 67b, and the electromagnetic valve is opened or closed by operating a switch (not shown) attached on the door or another portion, and for example, is opened prior to opening the door.

The pressure regulator 60 further includes an actuation controller 68 which detects the temperature inside the freezing store 11; if the inside temperature is equal to or more than a predetermined temperature, actuates the suction pump 62a of the depressurizer to decrease the inside gas pressure to a pressure equal to or less than the atmospheric pressure; and when the inside temperature drops below the predetermined temperature, stops the suction pump 62a of the depressurizer and actuates the pressurizing pump 61a of the pressurizer to increase the inside gas pressure to a pressure equal to or more than the atmospheric pressure. The actuation controller 68 includes a control unit 68a comprising a microcomputer, a pressure sensor 68*b* and a temperature sensor 68*c* disposed inside the freezing store, and an operation panel 68*d*. The actuator 68 controls actuations of the suction pump 62*a* and the pressurizing pump 61*a* in response to sensor signals sent from the sensors 68*b* and 68*c*.

A number of operation control programs catered to a number of types of objects-to-be-frozen are pre-stored in a storage of the control unit 68*a*. The operation control program is automatically selected according to a type of object-to-be-frozen specified through the operation panel 68*d*, and is executed. These operation control programs are roughly classified into three operation modes, that is, a continuously pressurizing operation mode with which the control unit 68*a* increases the pressure inside the freezing store to a pressure over the atmospheric pressure from start to stop, a continuously depressurizing operation mode with which the control unit 68*a* decreases the pressure inside the freezing store to a pressure below the atmospheric pressure from start to stop, and a pressurizing-depressurizing combination operation mode with which the control unit 68*a* first decreases the pressure inside the freezing store to a pressure below the atmospheric pressure upon being actuated, and increases the inside pressure to a pressure over the atmospheric pressure once the inside temperature drops to a predetermined value. Information such as the type of gas to be pressurized or depressurized, the gas pressure change over time, and pressure levels are set and stored as control data in order to achieve an optimal condition for a freezing target such as the type of object-to-be-frozen 3 and the length of the freezing period.

More specifically, when the continuously pressurizing operation mode fits for the type of object-to-be-frozen inputted and set through the operation panel 68*d*, the control unit 68*a* has the pressurizing pump 61*a* operate continuously or intermittently to maintain a specified inside pressure that is over the atmospheric pressure. When the continuously depressurizing operation mode fits for the type of object-to-be-frozen inputted and set, the control unit 68*a* has the suction pump 62*a* operate continuously or intermittently to maintain a specified inside pressure that is below the atmospheric pressure. When the pressurizing-depressurizing combination operation mode fits for the type of object-to-be-frozen inputted and set, the control unit 68*a*, upon being actuated, has the suction pump 62*a* operate continuously or intermittently to maintain a specified inside pressure below the atmospheric pressure until the inside temperature drops to a specified temperature, and once the inside temperature drops to the predetermined value, then the control unit 68*a* has the pressurizing pump 61*a* operate continuously or intermittently to maintain a specified inside pressure over the atmospheric pressure.

With the continuously pressurizing operation mode, the surface of an object-to-be-frozen is enclosed by a pressurized and cooled gas while cold is penetrating to the inside of the object-to-be-frozen, so that oxidization occurring during freezing is prevented and deformation is reduced. With the continuously depressurizing operation mode, it is possible to actively suck a deterioration-facilitating gas which is emitted from the surface and inside of an object-to-be-frozen 3, so that it is possible to complete freezing with less deterioration and deformation. Further, with the depressurizing mode, cooling can reach the inside of an object-to-be-frozen 3 more quickly, so that tissue and cell deformation can be prevented as much as possible. Furthermore, before a gas emitted from an object-to-be-frozen 3 affects another object 3 next to it, the gas can be expelled, so that harmful influences between each object-to-be-frozen 3 and its neighboring object 3 can be eliminated.

With the pressurizing-depressurizing combination operation mode, in which a pressure inside the freezing store and therefore the oxygen amount is first decreased using the suction pump 62*a* and then the inside pressure is increased using the pressurizing pump 61*a*, the above-described quality-retention effects brought about by depressurizing and pressurizing are combined to produce a synergy effect, which contributes to stronger prevention of deterioration and deformation. Meanwhile, in pressurizing, instead of using air, a gas selected according to an object-to-be-frozen, such as a nitrogen gas, may be pressurized and compressed and then be actively supplied. With this arrangement, it becomes possible to efficiently and easily replace the gas inside of the freezing store with a gas having less harmful components.

FIG. 2 is a schematic diagram illustrating a transverse cross-section including the freezing store and the open/close door of the quick freezing apparatus according to the present invention. As shown in FIG. 2, an opening is formed on the front surface of the main body 13 of the freezing store 11 to bring in or take out an object-to-be-frozen 3. To this opening, the open/close door 13*c* is provided to expose and cover the opening.

Meanwhile, there is possibility such that, while the door 13*c* is opened to bring in or take out an object-to-be-frozen 3, the outside air along with dust or the like might flow into the freezing store. It is necessary to prevent such an undesired inflow in order to maintain the inside gas in a clean and optimal state at any time. Here, if the inside pressure is more than the outside pressure, just the inside gas flows out of the freezing store, and as long as the pressurizing pump 61*a* continues to supply a gas, there is no need to worry about the inflow of the outside air. However, if the inside pressure is equal to or below the outside pressure (atmospheric pressure), prevention of the inflow of the outside air should be taken care of.

Then, as one measure for this problem, in the freezing store near the door opening thereof, there is provided a gas curtain unit 70 which produces a layered gas flow A flowing from the upper side to the lower side. The gas flow A prevents the outside gas from mixing with the inside gas when the door 13*c* is opened. The gas curtain unit 70 includes a gas supply source 71, a pressurizer 72 for pressurizing a gas supplied from the gas supply source 71, a discharge pipe 73 for leading a gas pressurized by the pressurizer 72 to the upper edge of the opening of the freezing store 11, a suction pipe 74 including a suction port 74*a* located at the lower edge of the door opening of the freezing store 11, the suction port 74*a* drawing a gas sent out from a discharge port 73*a* at a tip of the discharge pipe 73, and a sucker 75 for drawing a gas sent out from the discharge port 73*a* through the suction pipe 74. The discharge pipe 73 branches, and the suction pipe 74 also branches with the same number of branches as those of the pipe 73 (not shown). The discharge ports 73*a* are respectively formed at the tips of the pipe 73, and the suction ports 74*a* are respectively formed at the tips of the pipe 74. The ports 73*a* and 74*a* are aligned along the lateral direction of the door opening such that each of the ports 73*a* is positioned vertically opposite each of the ports 74*a*. Open/close valves 76 are provided in the discharge pipe 73 and the suction pipe 74, respectively. Also, the open/close valve 76 is provided in a pipe connecting the gas supply source 71 and the pressurizer 72.

In the present embodiment, an electromagnetic valve is adopted as the open/close valve 76, and the electromagnetic valve is opened and closed by operating a switch (not shown) attached on the door 13*c* or another portion. The same switch can also actuate the discharge pump 72 and the suction pump 75 simultaneously, and the pumps 72 and 75 are actuated so as to carry out an opening operation prior to opening the door 13c. The before-described pressurizing pump 61a and the suction pump 62a, which are used for adjusting the inside pressure, may additionally serve as the discharge pump 72 and the suction pump 75.

Having described the embodiment of the present invention, the invention should not be construed limited by any of the details of this description. The present invention can be changed and modified without departing from the scope of the claims.

Figure 3:
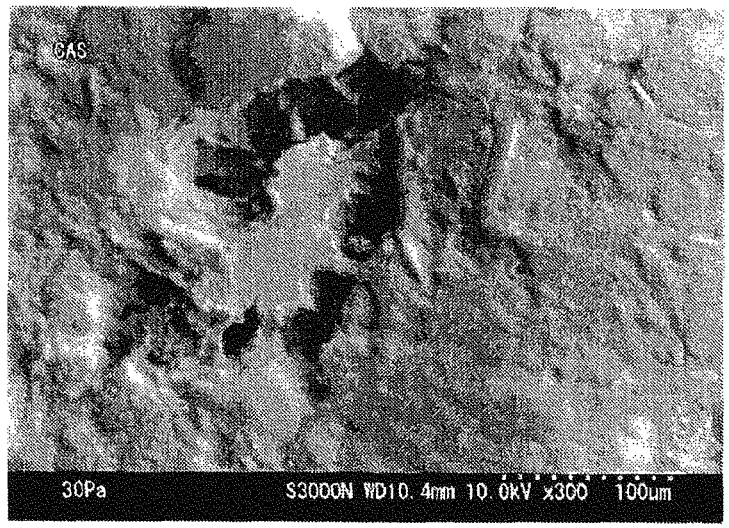
FIG. 3A illustrates an electron microscope image of a mackerel thawed after being frozen-preserved using the quick freezing apparatus and method according to the present invention.
FIG. 3B illustrates an electron microscope image of a mackerel thawed after being frozen-preserved using a conventional quick freezing apparatus and method.
Figure 3:
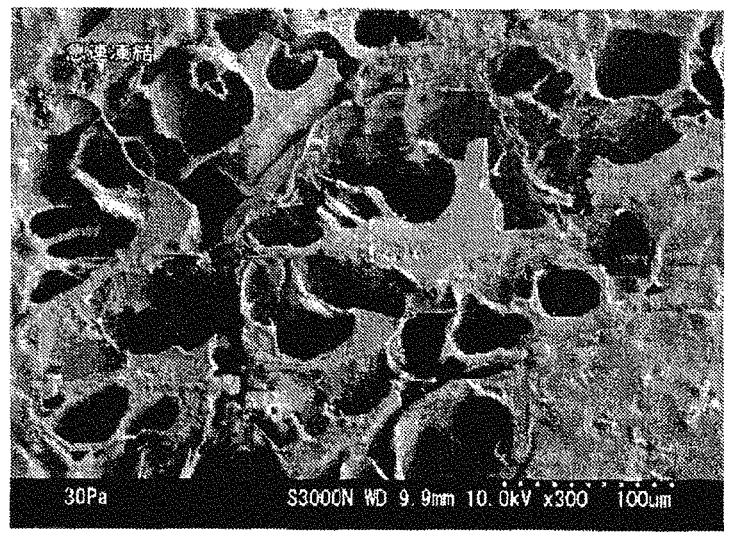

FIG. 3A shows a microscope image of a section of a tissue of a mackerel thawed after being frozen-preserved using a quick freezing apparatus according to the present invention. FIG. 3B shows a microscope image of a section of a tissue of a mackerel thawed after being frozen-preserved using a conventional quick freezing apparatus. Both images are taken at 300× magnification using a scanning electron microscope.

As can be clearly seen from the comparison of these images, the image of the freezing technology of the present invention shows that the tissue is preserved in a good state without being destroyed. On the other hand, the image of the conventional freezing technology clearly shows that the ice remaining in the tissue cell compresses and damages its surrounding tissue. The black holes shown in the images are traces after the ice formed in the tissue has sublimed.

Figure 4:
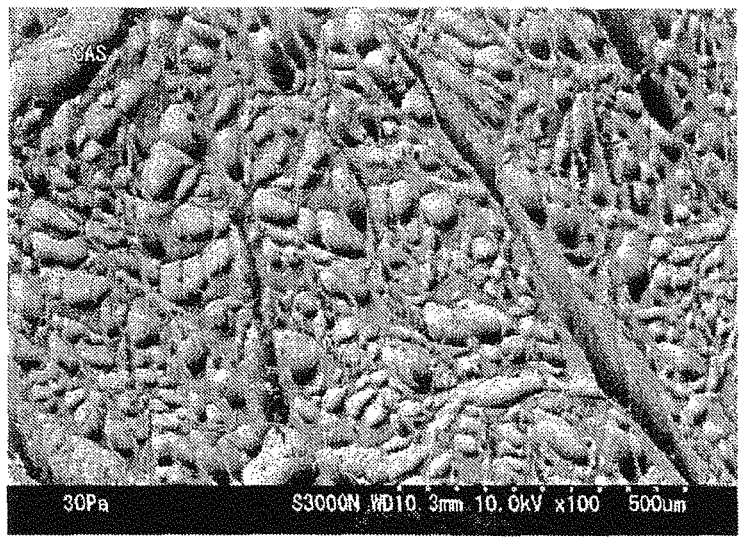
FIG. 4A illustrates an electron microscope image of a lobster thawed after being frozen-preserved using the quick freezing apparatus and method according to the present invention.
FIG. 4B illustrates an electron microscope image of a lobster thawed after being frozen-preserved using the conventional quick freezing apparatus and method.
Figure 4:
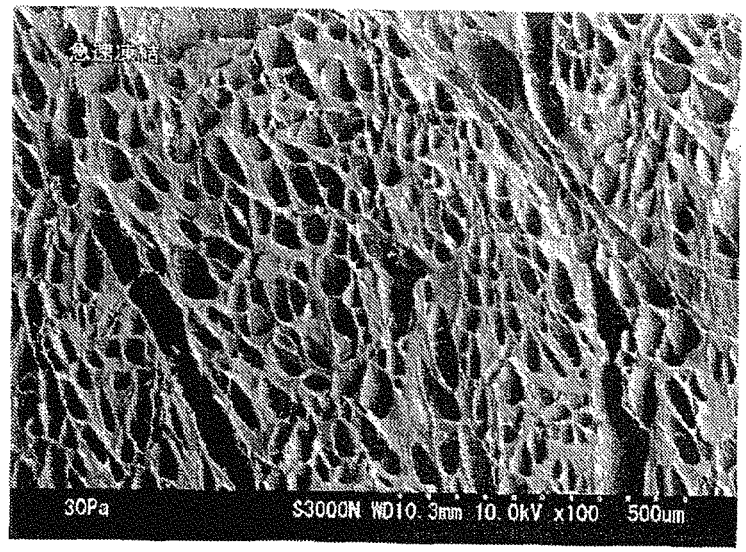

Similarly, FIG. 4A shows an electron microscope image of a section of a tissue of a lobster thawed after being frozen-preserved using the quick freezing apparatus according to the present invention. FIG. 4B shows an electron microscope image of a section of a tissue of a lobster thawed after being frozen-preserved using the conventional quick freezing apparatus.

As can be clearly seen from the comparison of these images, the image of the freezing technology of the present invention shows that the tissue is preserved in a good state without being destroyed. On the other hand, the image of the conventional freezing technology clearly shows that the ice remaining in the tissue cell compresses and damages its surrounding tissue. The black holes shown in the images are traces after the ice formed in the tissue has sublimed.

It is claimed:

1. A quick freezing apparatus comprising:
    a freezing store including a door for bringing in or taking out an object-to-be-frozen;
    a freezer capable of lowering a temperature inside the freezing store to a temperature equal to or less than approximately −30 degrees centigrade;
    a pressure regulator capable of adjusting a gas pressure inside the freezing store; and
    a ventilator for sending cold air at a wind velocity of 1 to 5 m/sec toward the object-to-be-frozen placed inside the freezing store,
    wherein the pressure regulator comprises a pressurizer for increasing the inside gas pressure to a pressure equal to or more than atmospheric pressure by supplying a pressurized gas into the freezing store, and a depressurizer for decreasing the inside gas pressure to a pressure equal to or less than the atmospheric pressure by drawing the inside gas, and
    wherein the pressure regulator includes an actuation controller for
        detecting the temperature inside the freezing store,
        if the detected inside temperature is equal to or more than a predetermined temperature, then actuating the depressurizer to decrease the inside gas pressure to a pressure equal to or less than the atmospheric pressure, and
        when the inside temperature drops below the predetermined temperature, stopping the depressurizer and actuating the pressurizer to increase the inside gas pressure to a pressure equal to or more than the atmospheric pressure.

2. A quick freezing apparatus comprising:
    a freezing store including a door for bringing in or taking out an object-to-be-frozen;
    a freezer capable of lowering a temperature inside the freezing store to a temperature equal to or less than approximately −30 degrees centigrade;
    a pressure regulator capable of adjusting a gas pressure inside the freezing store; and
    a ventilator for sending cold air at a wind velocity of 1 to 5 m/sec toward the object-to-be-frozen placed inside the freezing store,
    wherein the pressure regulator comprises a pressurizer for increasing the inside gas pressure to a pressure equal to or more than atmospheric pressure by supplying a pressurized gas into the freezing store, and
    wherein the pressurizer comprises a pressurizing pump, and a gas introduction path of the pressurizing pump is connected to a circulating path through which a gas inside the freezing store is circulated.

3. A quick freezing apparatus comprising:
    a freezing store including a door for bringing in or taking out an object-to-be-frozen;
    a freezer capable of lowering a temperature inside the freezing store to a temperature equal to or less than approximately −30 degrees centigrade;
    a pressure regulator capable of adjusting a gas pressure inside the freezing store; and
    a ventilator for sending cold air at a wind velocity of 1 to 5 m/sec toward the object-to-be-frozen placed inside the freezing store,
    wherein the pressure regulator comprises a depressurizer for decreasing the inside gas pressure to a pressure equal to or less than atmospheric pressure by drawing the inside gas, and
    wherein the depressurizer comprises a suction pump, and a discharge side of the suction pump is connected to a circulating path through which a sucked gas is circulated to the inside of the freezing store.

4. The quick freezing apparatus according to claim 1, wherein the pressurizer comprises a pressurizing pump and the depressurizer comprises a suction pump, and a discharge side of the suction pump is connected to a circulating path through which a sucked gas is circulated to a gas introduction path of the pressurizing pump.

5. The quick freezing apparatus according to claim 2, wherein a sterilizer is provided in the gas circulating path of the pressurizer.

6. The quick freezing apparatus according to claim 3, wherein a sterilizer is provided in the gas circulating path of the depressurizer.

7. The quick freezing apparatus according to claim 2, wherein an oxygen absorber is provided in the gas circulating path of the pressurizer.

8. The quick freezing apparatus according to claim 3, wherein an oxygen absorber is provided in the gas circulating path of the depressurizer.

9. The quick freezing apparatus according to claim 2, wherein a gas supply source is provided to the gas circulating path of the pressurizer, the gas supply source selecting and supplying any gas suitable for the object-to-be-frozen such as a nitrogen gas.

10. The quick freezing apparatus according to claim 1, further comprising a gas introducer for, when the door of the freezing store is opened, supplying into the freezing store any gas suitable for the object-to-be-frozen such as a nitrogen gas to increase the inside gas pressure back to the atmospheric pressure level.

11. The quick freezing apparatus according to claim 1, further comprising a gas curtain unit provided near a door opening of the freezing store for producing a layered gas flow from the upper side toward the lower side, the layered gas flow preventing the outside gas from mixing with the inside gas when the door is opened.

12. The quick freezing apparatus according to claim 1, wherein an oxygen absorber is disposed in the freezing store.

13. The quick freezing apparatus according to claim 1, wherein a sterilizer is disposed in the freezing store.

14. The quick freezing apparatus according to claim 1, wherein the pressurizer comprises a pressurizing pump, and a gas introduction path of the pressurizing pump is connected to a circulating path through which a gas inside the freezing store is circulated.

15. The quick freezing apparatus according to claim 1, wherein the depressurizer comprises a suction pump, and a discharge side of the suction pump is connected to a circulating path through which a sucked gas is circulated to the inside of the freezing store.

16. The quick freezing apparatus according to claim 4, wherein an oxygen absorber is provided in the gas introduction path of the pressurizer.

17. The quick freezing apparatus according to claim 4, wherein a gas supply source is provided to the gas introduction path of the pressurizer, the gas supply source selecting and supplying any gas suitable for the object-to-be-frozen such as a nitrogen gas.

18. The quick freezing apparatus according to claim 2, wherein an oxygen absorber is disposed in the freezing store.

19. The quick freezing apparatus according to claim 2, wherein a sterilizer is disposed in the freezing store.

20. The quick freezing apparatus according to claim 3, further comprising a gas introducer for, when the door of the freezing store is opened, supplying into the freezing store any gas suitable for the object-to-be-frozen such as a nitrogen gas to increase the inside gas pressure back to the atmospheric pressure level.

21. The quick freezing apparatus according to claim 3, further comprising a gas curtain unit provided near a door opening of the freezing store for producing a layered gas flow from the upper side toward the lower side, the layered gas flow preventing the outside gas from mixing with the inside gas when the door is opened.

22. The quick freezing apparatus according to claim 3, wherein an oxygen absorber is disposed in the freezing store.

23. The quick freezing apparatus according to claim 3, wherein a sterilizer is disposed in the freezing store.

* * * * *